(12) United States Patent
Zhang et al.

(10) Patent No.: US 10,965,552 B2
(45) Date of Patent: Mar. 30, 2021

(54) METHOD AND APPARATUS FOR MANAGING VIRTUALIZED NETWORK FUNCTION

(71) Applicant: Huawei Technologies Co., Ltd., Shenzhen (CN)

(72) Inventors: Kai Zhang, Shanghai (CN); Lan Zou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/720,324

(22) Filed: Sep. 29, 2017

(65) Prior Publication Data

US 2018/0026858 A1   Jan. 25, 2018

Related U.S. Application Data

(63) Continuation of application No. PCT/CN2015/075580, filed on Mar. 31, 2015.

(51) Int. Cl.
*G06F 15/173* (2006.01)
*H04L 12/24* (2006.01)
(Continued)

(52) U.S. Cl.
CPC ......... *H04L 41/5054* (2013.01); *H04L 12/46* (2013.01); *H04L 29/08* (2013.01);
(Continued)

(58) Field of Classification Search
None
See application file for complete search history.

(56) References Cited

U.S. PATENT DOCUMENTS

| 9,979,602 | B1* | 5/2018 | Chinnakannan | ........ H04L 47/82 |
| 2015/0082308 | A1* | 3/2015 | Kiess | .................. G06F 9/45558 718/1 |

(Continued)

FOREIGN PATENT DOCUMENTS

| CN | 1863068 A | 11/2006 |
| CN | 102541662 A | 7/2012 |

(Continued)

OTHER PUBLICATIONS

European Telecommunications Standards Institute (ETSI), Network Functions Virtualisation (NFV); Management and Orchestration, ETSI GS NFV-MAN 001 VI .1.1, XP014235740, pp. 1-184 (Dec. 2014). (Year: 2014).*

(Continued)

*Primary Examiner* — Phyllis A Book
(74) *Attorney, Agent, or Firm* — Leydig, Voit & Mayer, Ltd.

(57) ABSTRACT

Embodiments of the present application disclose a method and an apparatus for managing a virtualized network function, and relate to the field of virtualization technologies, so as to improve work efficiency and resource usage. The method provided in the embodiments of the present application includes: allocating a resource to and configuring deployment specific parameters for a to-be-instantiated virtualized network function (VNF) to obtain a semi-instantiated VNF; and storing information of the semi-instantiated VNF, where the information of the semi-instantiated VNF includes an identifier of the semi-instantiated VNF, resource information of the semi-instantiated VNF, and deployment specific parameters of the semi-instantiated VNF.

18 Claims, 7 Drawing Sheets

NFV System

(51) Int. Cl.
  *H04L 29/08* (2006.01)
  *H04L 12/46* (2006.01)
  *G06F 9/50* (2006.01)

(52) U.S. Cl.
  CPC .......... *H04L 41/00* (2013.01); *H04L 41/0803* (2013.01); *H04L 41/0806* (2013.01); *H04L 41/0853* (2013.01); *G06F 9/5077* (2013.01); *H04L 41/0886* (2013.01)

(56) References Cited

U.S. PATENT DOCUMENTS

| | | | |
|---|---|---|---|
| 2015/0180730 A1* | 6/2015 | Felstaine | G06F 11/0709 709/225 |
| 2015/0358248 A1* | 12/2015 | Saha | H04L 47/12 709/226 |
| 2017/0012968 A1 | 1/2017 | Feng et al. | |
| 2017/0244596 A1* | 8/2017 | Chen | H04L 12/1407 |

FOREIGN PATENT DOCUMENTS

| | | |
|---|---|---|
| CN | 105122738 A | 12/2015 |
| WO | 2014169870 A1 | 10/2014 |

OTHER PUBLICATIONS

"Network Functions Virtualisation (NFV); Virtual Network Functions Architecture," ETSI GS NFV-SWA 001 V1.1.1, XP014235735, pp. 1-93, European Telecommunications Standards Institute (ETSI) (Dec. 2014).

"Network Functions Virtualisation (NFV); Management and Orchestration," ETSI GS NFV-MAN 001 V1.1.1, XP014235740, pp. 1-184, European Telecommunications Stansards Institute(ETSI), (Dec. 2014).

"Local validation to VNFD/NSD," ETSI Draft, XP014228956, NFVMAN(14)000406, pp. 1-12, European Telecommunications Standards Institute (Oct. 14, 2014).

* cited by examiner

NFV System

METHOD AND APPARATUS FOR MANAGING VIRTUALIZED NETWORK FUNCTION

CROSS-REFERENCE TO RELATED APPLICATIONS

This application is a continuation of International Application No. PCT/CN2015/075580, filed on Mar. 31, 2015, the disclosure of which is hereby incorporated by reference in its entirety.

TECHNICAL FIELD

The present application relates to the field of virtualization technologies, and in particular, to a method and an apparatus for managing a virtualized network function (VNF).

BACKGROUND

With rapid development of virtualization technologies, a network functions virtualization (NFV) technology becomes more important. The NFV technology means performing instantiation on a VNF, so that an instantiated VNF can run on a general-purpose physical device, so as to implement a function of a dedicated network element device on a network by using the general-purpose physical device. For example, instantiation is performed on a virtualized network function of a serving gateway (SGW), so that a virtualized instance of the SGW, that is, an instantiated VNF, can run on a general-purpose physical device, so as to implement a function of the SGW by using the general-purpose physical device.

An NFV system mainly includes the following logical function modules: a network functions virtualization orchestrator (NFVO), a virtualized network function manager (VNFM), an element manager (EM), and the like.

In the prior art, a method for performing instantiation on a VNF may include: after a VNFM receives a request of VNF instantiation used to perform instantiation on a virtualized network function of a network element, that is, a to-be-instantiated VNF, the VNFM first instructs an NFVO to allocate a resource to the to-be-instantiated VNF; and then the VNFM configures deployment specific parameters for the to-be-instantiated VNF to which the resource is allocated; and finally, the VNFM instructs an EM to configure application specific parameters for the to-be-instantiated VNF for which the deployment specific parameters are configured, so as to obtain an instantiated VNF (that is, a VNF for which instantiation is performed). It should be noted that the instantiated VNF can run and execute a network element function indicated by the VFN instantiation request.

Currently, in a process of performing instantiation on a VNF according to the method, the VNF is managed according to the following method: A step of allocating a resource, a step of configuring deployment specific parameters, and a step of configuring application specific parameters are "tightly coupled", that is, the steps are completed as a whole. According to the method for managing a VNF, a resource, such as information of a to-be-instantiated VNF to which a resource is allocated or information of a to-be-instantiated VNF for which deployment specific parameters are configured, that is obtained in a process of performing instantiation on the VNF each time is used and released in a subsequent step. Therefore, in another scenario requiring use of the information, for example, in a scenario in which instantiation needs to be re-performed on a to-be-instantiated VNF, the information needs to be generated first, and then a corresponding operation can be executed. Consequently, a problem of low work efficiency and low resource usage is caused.

SUMMARY

Embodiments of the present application provide a method for managing a virtualized network function and an apparatus, so as to improve work efficiency and resource usage.

To achieve the foregoing objective, the following technical solutions are used in the embodiments of the present application.

According to a first aspect, a method for managing a VNF is provided, including:

allocating a resource to a to-be-instantiated VNF and configuring deployment specific parameters for the to-be-instantiated VNF to obtain a semi-instantiated VNF; and storing information of the semi-instantiated VNF, where the information of the semi-instantiated VNF includes an identifier of the semi-instantiated VNF, resource information of the semi-instantiated VNF, and deployment specific parameters of the semi-instantiated VNF.

With reference to the first aspect, in a first possible implementation, allocating the resource to the to-be-instantiated VNF and configuring deployment specific parameters for the to-be-instantiated VNF to obtain the semi-instantiated VNF includes:

allocating the resource to the to-be-instantiated VNF and configuring the deployment specific parameters for the to-be-instantiated VNF to obtain the semi-instantiated VNF, when a request message used to instruct to generate the semi-instantiated VNF is received; or allocating the resource to the to-be-instantiated VNF and configuring the deployment specific parameters for the to-be-instantiated VNF to obtain the semi-instantiated VNF, when a request message used to instruct to generate an instantiated VNF is received.

With reference to the first possible implementation of the first aspect, in a second possible implementation, after allocating the resource to the to-be-instantiated VNF and configuring the deployment specific parameters for the to-be-instantiated VNF to obtain the semi-instantiated VNF, when the request message used to instruct to generate the semi-instantiated VNF is received, the method further includes:

when a request message used to instruct to configure application specific parameters is received, configuring application specific parameters for the semi-instantiated VNF to obtain an instantiated VNF; or when a request message used to instruct to generate an instantiated VNF is received, configuring application specific parameters for the semi-instantiated VNF to obtain the instantiated VNF.

With reference to the first possible implementation of the first aspect, in a third possible implementation, after allocating the resource to the to-be-instantiated VNF and configuring the deployment specific parameters for the to-be-instantiated VNF to obtain the semi-instantiated VNF, when the request message used to instruct to generate the instantiated VNF is received, the method further includes:

configuring, according to the request message used to instruct to generate an instantiated VNF, application specific parameters for the semi-instantiated VNF to obtain the instantiated VNF.

With reference to the second possible implementation or the third possible implementation of the first aspect, in a fourth possible implementation, after the instantiated VNF is obtained, the method further includes:

deleting the semi-instantiated VNF; or establishing a mapping relationship between the semi-instantiated VNF and the instantiated VNF, and storing the mapping relationship.

With reference to the fourth possible implementation of the first aspect, in a fifth possible implementation, after deleting the semi-instantiated VNF, the method further includes:

before deleting the instantiated VNF or when deleting the instantiated VNF, restoring the semi-instantiated VNF.

With reference to the fourth possible implementation of the first aspect, in a sixth possible implementation, after establishing the mapping relationship between the semi-instantiated VNF and the instantiated VNF, and storing the mapping relationship, the method further includes:

after deleting the instantiated VNF, reserving or deleting the semi-instantiated VNF.

With reference to the first aspect, in a seventh possible implementation, after the storing information of the semi-instantiated VNF, the method further includes:

when receiving an update request message, updating the information of the semi-instantiated VNF, where the update request message is used to instruct to delete or modify the semi-instantiated VNF.

With reference to any one of the first aspect, or the first possible implementation to the seventh possible implementation of the first aspect, in an eighth possible implementation, the resource information of the semi-instantiated VNF includes one or a combination of multiple of the following information: a storage resource, a computing resource, and a network resource.

With reference to any one of the first aspect, or the first possible implementation to the eighth possible implementation of the first aspect, in a ninth possible implementation, the deployment specific parameters of the semi-instantiated VNF include one or a combination of multiple of the following information: vendor information, a virtual deployment unit, a virtual link, a connection point, a deployment flavour, and an auto scaling policy.

According to a second aspect, an apparatus is provided, including:

a first generation unit, configured to allocate a resource to a to-be-instantiated virtualized network function (VNF) and configure deployment specific parameters for the to-be-instantiated VNF to obtain a semi-instantiated VNF; and a storage unit, configured to store information of the semi-instantiated VNF, where the information of the semi-instantiated VNF includes an identifier of the semi-instantiated VNF, resource information of the semi-instantiated VNF, and deployment specific parameters of the semi-instantiated VNF.

With reference to the second aspect, in a first possible implementation, the first generation unit is specifically configured to:

allocate the resource to the to-be-instantiated VNF and configure the deployment specific parameters for the to-be-instantiated VNF to obtain the semi-instantiated VNF, when receiving a request message used to instruct to generate the semi-instantiated VNF; or allocate the resource to the to-be-instantiated VNF and configure the deployment specific parameters for the to-be-instantiated VNF to obtain the semi-instantiated VNF, when receiving a request message used to instruct to generate an instantiated VNF.

With reference to the first possible implementation of the second aspect, in a second possible implementation, the apparatus further includes a second generation unit, configured to:

after the first generation unit allocates the resource to the to-be-instantiated VNF and configures the deployment specific parameters for the to-be-instantiated VNF to obtain the semi-instantiated VNF, when receiving the request message used to instruct to generate the semi-instantiated VNF, configure application specific parameters for the semi-instantiated VNF to obtain an instantiated VNF, when receiving the request message used to instruct to configure application specific parameters; or after the first generation unit allocates the resource to the to-be-instantiated VNF and configures the deployment specific parameters for the to-be-instantiated VNF to obtain the semi-instantiated VNF, when receiving the request message used to instruct to generate the semi-instantiated VNF, configure application specific parameters for the semi-instantiated VNF to obtain an instantiated VNF, when receiving a request message used to instruct to generate the instantiated VNF.

With reference to the first possible implementation of the second aspect, in a third possible implementation, the apparatus further includes:

a second generation unit, configured to: after the first generation unit allocates the resource to the to-be-instantiated VNF and configures the deployment specific parameters for the to-be-instantiated VNF to obtain the semi-instantiated VNF, when receiving the request message used to instruct to generate the instantiated VNF, configure, according to the request message used to instruct to generate the instantiated VNF, application specific parameters for the semi-instantiated VNF to obtain the instantiated VNF.

With reference to the second possible implementation or the third possible implementation of the second aspect, in a fourth possible implementation, the apparatus further includes:

a deletion unit, configured to: after the second generation unit obtains the instantiated VNF, delete the semi-instantiated VNF.

With reference to the fourth possible implementation of the second aspect, in a fifth possible implementation, the deletion unit is further configured to: after deleting the instantiated VNF, delete the semi-instantiated VNF; and the apparatus further includes:

a restoration unit, configured to: before the deletion unit deletes the instantiated VNF or when the deletion unit deletes the instantiated VNF, restore the semi-instantiated VNF.

With reference to the second possible implementation or the third possible implementation of the second aspect, in a sixth possible implementation, the apparatus further includes:

an establishment unit, configured to: after the second generation unit obtains the instantiated VNF, establish a mapping relationship between the semi-instantiated VNF and the instantiated VNF; and the storage unit is further configured to store the mapping relationship.

With reference to the sixth possible implementation of the second aspect, in a seventh possible implementation, the apparatus further includes a deletion unit, configured to: after the storage unit stores the mapping relationship, delete the instantiated VNF;

the storage unit is further configured to: after the deletion unit deletes the instantiated VNF, reserve the semi-instantiated VNF; or the deletion unit is further configured to: after deleting the instantiated VNF, delete the semi-instantiated VNF.

With reference to the second aspect, in an eighth possible implementation, the apparatus further includes:

an update unit, configured to: when receiving an update request message, update the information of the semi-instantiated VNF, where the update request message is used to instruct to delete or modify the semi-instantiated VNF.

With reference to any one of the second aspect, or the first possible implementation to the eighth possible implementation of the second aspect, in a ninth possible implementation, the resource information of the semi-instantiated VNF includes one or a combination of multiple of the following information: a storage resource, a computing resource, and a network resource.

With reference to any one of the second aspect, or the first possible implementation to the ninth possible implementation of the second aspect, in a tenth possible implementation, the deployment specific parameters of the semi-instantiated VNF include one or a combination of multiple of the following information: vendor information, a virtual deployment unit, a virtual link, a connection point, a deployment flavour, and an auto scaling policy.

According to the method for managing a VNF and the apparatus provided in the first aspect and the second aspect, a semi-instantiated VNF is obtained by allocating a resource to and configuring deployment specific parameters for a to-be-instantiated VNF, and information of the semi-instantiated VNF is stored, where the information includes an identifier of the semi-instantiated VNF, resource information of the semi-instantiated VNF, and deployment specific parameters of the semi-instantiated VNF. In this way, because the information of the semi-instantiated VNF is stored, the information can be applied to another scenario. For example, in a scenario in which instantiation is re-performed on a same to-be-instantiated VNF, a step of allocating a resource and a step of configuring deployment specific parameters do not need to be performed again, and an instantiated VNF may be directly generated by using the stored information of the semi-instantiated VNF, so as to improve work efficiency and resource usage.

According to a third aspect, a method for managing a VNF is provided, including:

allocating a resource to a to-be-instantiated VNF to obtain a semi-instantiated VNF; and storing information of the semi-instantiated VNF, where the information of the semi-instantiated VNF includes an identifier of the semi-instantiated VNF and resource information of the semi-instantiated VNF.

With reference to the third aspect, in a first possible implementation, allocating the resource to the to-be-instantiated VNF to obtain the semi-instantiated VNF includes:

allocating the resource to the to-be-instantiated VNF to obtain the semi-instantiated VNF, when a request message used to instruct to generate the semi-instantiated VNF is received; or allocating the resource to the to-be-instantiated VNF to obtain the semi-instantiated VNF, when a request message used to instruct to generate an instantiated VNF is received.

With reference to the first possible implementation of the third aspect, in a second possible implementation, after the allocating the resource to the to-be-instantiated VNF to obtain the semi-instantiated VNF, when the request message used to instruct to generate the semi-instantiated VNF is received, the method further includes:

when a request message used to instruct to configure deployment specific parameters and application specific parameters is received, configuring deployment specific parameters and application specific parameters for the semi-instantiated VNF to obtain an instantiated VNF; or when a request message used to instruct to generate an instantiated VNF is received, configuring deployment specific parameters and application specific parameters for the semi-instantiated VNF to obtain an instantiated VNF.

With reference to the first possible implementation of the third aspect, in a third possible implementation, after allocating the resource to the to-be-instantiated VNF to obtain the semi-instantiated VNF, when the request message used to instruct to generate the instantiated VNF is received, the method further includes:

configuring, according to the request message used to instruct to generate the instantiated VNF, deployment specific parameters and application specific parameters for the semi-instantiated VNF to obtain the instantiated VNF.

According to a fourth aspect, an apparatus is provided, including:

a first generation unit, configured to allocate a resource to a to-be-instantiated virtualized network function (VNF) to obtain a semi-instantiated VNF; and a storage unit, configured to store information of the semi-instantiated VNF, where the information of the semi-instantiated VNF includes an identifier of the semi-instantiated VNF and resource information of the semi-instantiated VNF.

With reference to the fourth aspect, in a first possible implementation, the first generation unit is specifically configured to:

allocate the resource to the to-be-instantiated VNF to obtain the semi-instantiated VNF, when receiving a request message used to instruct to generate the semi-instantiated VNF; or allocate the resource to the to-be-instantiated VNF to obtain the semi-instantiated VNF, when receiving a request message used to instruct to generate an instantiated VNF.

With reference to the first possible implementation of the fourth aspect, in a second possible implementation, the apparatus further includes a second generation unit, configured to:

after the first generation unit allocates the resource to the to-be-instantiated VNF to obtain the semi-instantiated VNF, when receiving the request message used to instruct to generate the semi-instantiated VNF, configure deployment specific parameters and application specific parameters for the semi-instantiated VNF to obtain an instantiated VNF, when receiving a request message used to instruct to configure deployment specific parameters and application specific parameters; or after the first generation unit allocates the resource to the to-be-instantiated VNF to obtain the semi-instantiated VNF, when receiving the request message used to instruct to generate the semi-instantiated VNF, configure deployment specific parameters and application specific parameters for the semi-instantiated VNF to obtain an instantiated VNF, when receiving a request message used to instruct to generate the instantiated VNF.

With reference to the first possible implementation of the fourth aspect, in a third possible implementation, the apparatus further includes:

a second generation unit, configured to: after the first generation unit allocates the resource to the to-be-instantiated VNF to obtain the semi-instantiated VNF, when receiving the request message used to instruct to generate the instantiated VNF, configure, according to the request message used to instruct to generate the instantiated VNF, deployment specific parameters and application specific parameters for the semi-instantiated VNF to obtain the instantiated VNF.

According to the method for managing a VNF and the apparatus provided in the third aspect and the fourth aspect, a semi-instantiated VNF is obtained by allocating a resource to a to-be-instantiated VNF, and information of the semi-instantiated VNF is stored, where the information includes an identifier of the semi-instantiated VNF and resource information of the semi-instantiated VNF. In this way, because the information of the semi-instantiated VNF is stored, the information can be applied to another scenario. For example, in a scenario in which instantiation is re-performed on a same to-be-instantiated VNF, a step of allocating a resource does not need to be performed again, and an instantiated VNF may be directly generated by using the stored information of the semi-instantiated VNF, so as to improve work efficiency and resource usage.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly and describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

First, an NFV system block diagram is described.

Figure 1:
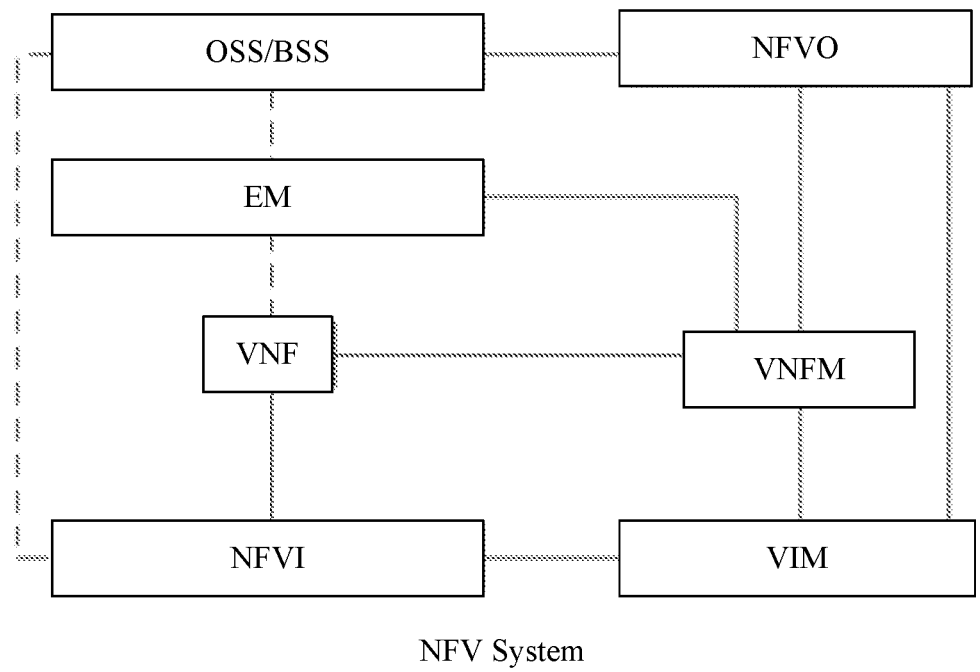
FIG. 1 is a schematic structural diagram of a typical NFV system block diagram according to an embodiment of the present application.

Referring to FIG. 1, FIG. 1 is a schematic structural diagram of a typical NFV system block diagram. The NFV system shown in FIG. 1 mainly includes the following logical function modules: an NFVO, a VNFM, a virtualized infrastructure manager (VIM), an operations support system (OSS) or a business support system BSS), an EM, a VNF node, network functions virtualization infrastructure (NFVI), and the like.

The NFVO is configured to perform deployment, operation, management, and coordination on the VNF and the NFVI corresponding to the NFVO. The VNFM is configured to manage a life cycle of the VNF, such as instantiation, expansion or contraction, querying, updating, and termination. The VIM is an entry to infrastructure and resource management and can provide hardware related to the infrastructures and functions of virtualized resources such as configuration maintenance, resource monitoring, alarm, and performance management. Computing, storage, and network resources that are required by network functions virtualization are collectively referred to as the NFVI. The EM is configured to perform application-related parameter configuration on the VNF. The OSS or the BSS is configured to manage a life cycle of a network service (NS) and trigger the VNFM to manage the life cycle of the VNF. In embodiments of the present application, a typical implementation of the OSS or the BSS may be a network manager (NM).

It should be noted that one NFV system may include one or more VNFMs, and each VNFM is connected to an NFVO. All VNFMs may be connected to one EM, or may be respectively connected to different EMs.

To facilitate understanding by a person skilled in the art, some terms used in this specification are described and explained.

(1) To-be-instantiated VNF

A "to-be-instantiated VNF" is a to-be-instantiated virtualized network function of a network element in any communications standard.

The "communications standard" may include but is not limited to: a 3rd Generation (3G) mobile communications technology such as Wideband Code Division Multiple Access (WCDMA), and 4G or 4G-advanced mobile communications technology such as Long Term Evolution (LTE) or LTE-Advanced LTE-A).

A "network element" may be any network element in an access network or a core network, such as an SGW, a packet data network gateway (PDN GW), a base station, and a mobility management entity (MME).

(2) "Semi-instantiated VNF"

Only after a resource is allocated to and deployment specific parameters and application specific parameters are configured for a to-be-instantiated VNF, the VNF can run and execute a corresponding network element function, that is, an instantiated VNF is obtained. Therefore, in the embodiments of the present application, a VNF in a process of obtaining an instantiated VNF is referred to as a "semi-instantiated VNF".

Specifically, in one embodiment of the present application, a VNF that is obtained after a resource is allocated to and deployment specific parameters are configured for a to-be-instantiated VNF and before application specific parameters are configured for the to-be-instantiated VNF is referred to as a "semi-instantiated VNF".

In another embodiment of the present application, a VNF that is obtained after a resource is allocated to a to-be-instantiated VNF and before deployment specific parameters are configured for the to-be-instantiated VNF is referred to as a "semi-instantiated VNF". The "semi-instantiated VNF" may also be referred to as a dummy VNF, or a generic VNF, or the like.

(3) The term "multiple" means two or more.

(4) "/" generally indicates an "or" relationship between associated objects.

The following gives a general description about a major technical solution provided in the embodiments of the present application.

The embodiments of the present application mainly provide a technical solution of how to manage updating (including increasing, modifying, and deleting) of a semi-instantiated VNF, a technical solution of how to manage a semi-instantiated VNF after a semi-instantiated VNF is used to generate an instantiated VNF, a technical solution of how to manage a semi-instantiated VNF when an instantiated VNF is deleted, and the like.

It should be noted that a method for managing a VNF provided in the embodiments of the present application may be executed by an entity device in which any logical function module (such as a VNFM, an NFVO, a VIM, or an OSS/BSS) is located in the NFV system. In terms of a function of each logical function module in the NFV system, optionally, the method is executed by an entity device in which the VNFM is located.

It should be further noted that any logical function module in the NFV system may be distributed on one or more entity devices. In other words, there may be one or more entity devices in which any logical function module is located. The embodiments of the present application impose no limitation on whether each step in a provided method embodiment is performed by one entity device or by different entity devices. For convenient and brief description, the logical function module is used as an execution body or a control object in the following description. A person of skill in the art should understand that in a specific implementation, a logical function module depends on a hardware resource on an entity device in which the logical function module is located.

The following explains and describes technical solutions provided in the embodiments of the present application by using specific examples.

Embodiment 1

Figure 2:
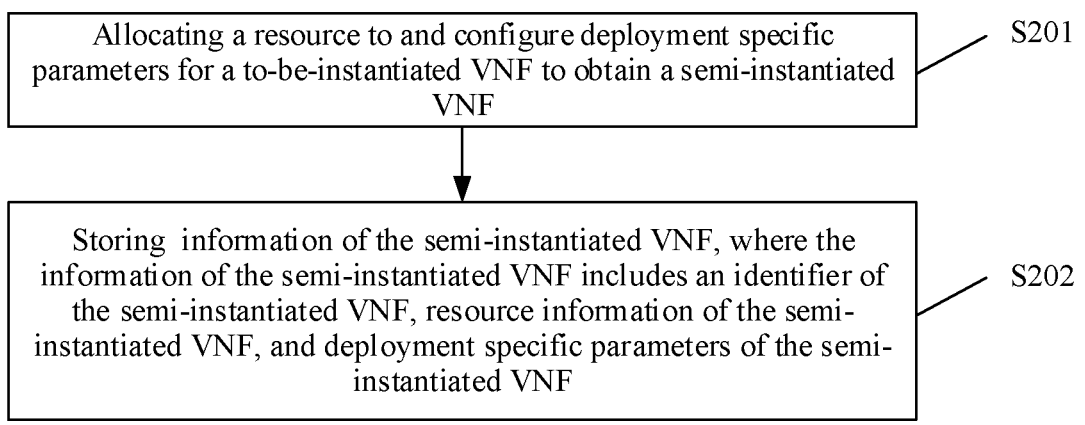
FIG. 2 is a schematic flowchart of a method for managing a VNF according to Embodiment 1 of the present application.

Referring to FIG. 2, FIG. 2 is a schematic flowchart of a method for managing a VNF according to this embodiment. The method for managing a VNF shown in FIG. 2 includes the following steps S201 and S202.

S201. Allocate a resource to and configure deployment specific parameters for a to-be-instantiated VNF to obtain a semi-instantiated VNF.

In this embodiment, the "semi-instantiated VNF" is a VNF that is obtained after the resource is allocated to and the deployment specific parameters are configured for the to-be-instantiated VNF and before application specific parameters are configured for the to-be-instantiated VNF.

"Allocating a resource to a to-be-instantiated VNF" specifically includes: allocating a virtualized resource to the to-be-instantiated VNF. The "resource" herein may include but is not limited to one or a combination of multiple of the following: a storage resource, a computing resource, a network resource, and the like.

The "deployment specific parameters" may include but are not limited to one or a combination of multiple of the following: vendor information, a virtual deployment unit (VDU), a virtual link (VL), a connection point, a deployment flavour, and an auto scaling policy, and the like.

For example, for a specific process of allocating a resource to and configuring deployment specific parameters for a to-be-instantiated VNF, reference may be made to any implementation method in the prior art. For example, a VNFM controls an NFVO to allocate the resource to the to-be-instantiated VNF, and the VNFM configures the deployment specific parameters for the to-be-instantiated VNF.

S202. Store information of the semi-instantiated VNF, where the information of the semi-instantiated VNF includes an identifier of the semi-instantiated VNF, resource information of the semi-instantiated VNF, and deployment specific parameters of the semi-instantiated VNF.

The "identifier of the semi-instantiated VNF" can uniquely identify the semi-instantiated VNF, specifically may be an identity (ID) of the semi-instantiated VNF, and specifically may include one or a combination of multiple of the following: a string, a hexadecimal string, and a binary string. In a specific implementation, an ID of a semi-instantiated VNF may be determined according to an ID of a different to-be-instantiated VNF.

In addition, the "information of the semi-instantiated VNF" may further include a name of the semi-instantiated VNF and the like. Names of semi-instantiated VNFs corresponding to different to-be-instantiated VNFs may be the same or may be different.

For example, the storing the information of the semi-instantiated VNF may include: storing the information of the semi-instantiated VNF in a database. The database may be an independent database, or may be a database implemented by a sub-function of a database in the VNFM. Theoretically, any logical function module in an NFV system may be responsible for managing the database. Optionally, the VNFM is responsible for managing the database. "Managing the database" may include: updating the database, maintaining a relationship between the database and another database, and the like. It should be noted that in the following, a database used to store the information of the semi-instantiated VNF is referred to as a "semi-instantiated VNF database".

It should be noted that S201 and S202 may be considered as an example of increasing semi-instantiation in a scenario of updating a semi-instantiated VNF.

According to the method for managing a VNF provided in this embodiment, a resource is allocated to and deployment specific parameters are configured for a to-be-instantiated VNF to obtain a semi-instantiated VNF, and information of the semi-instantiated VNF is stored, where the information includes an identifier of the semi-instantiated VNF, resource information of the semi-instantiated VNF, and deployment specific parameters of the semi-instantiated VNF. In this way, because the information of the semi-instantiated VNF is stored, the information can be applied to another scenario. For example, in a scenario in which instantiation is re-performed on the same to-be-instantiated VNF, according to the method for managing a VNF provided in this embodiment, a step of allocating a resource and a step of configuring deployment specific parameters do not need to be performed again, and an instantiated VNF can be directly generated by using a semi-instantiated VNF, thereby improving work efficiency and resource usage.

In addition, in a scenario in which an instantiated VNF is generated, if an error occurs in subsequent application specific parameters configuration, because a step of allocating a resource, a step of configuring deployment specific parameters, and a step of configuring application specific parameters are "tightly coupled" in the prior art, in this scenario, a resource allocated to the VNF needs to be released, and the step of allocating a resource, the step of configuring deployment specific parameters, and the step of configuring application specific parameters need to be performed again. In this embodiment, the resource does not need to be released, and the application specific parameters are configured for the stored semi-instantiated VNF to generate an instantiated VNF. It can be learned that work efficiency and resource usage can be improved according to the method provided in this embodiment.

Optionally, after S202, the method may further include: when receiving an update request message, updating the information of the semi-instantiated VNF, where the update request message is used to instruct to delete or modify the semi-instantiated VNF.

"Deleting the semi-instantiated VNF" may also be described as: deleting the information of the semi-instantiated VNF. In this case, the resource of the semi-instantiated VNF may be released or may be reserved. After the resource of the semi-instantiated VNF is released, the resource may be allocated to another to-be-instantiated VNF. In addition, the deployment specific parameters of the semi-instantiated VNF may be emptied.

"Modifying the semi-instantiated VNF" may include: performing expansion, contraction, or the like on the stored semi-instantiated VNF. "Modifying the semi-instantiated VNF" may specifically include: modifying one or more pieces of information such as the identifier of the semi-instantiated VNF, the resource information of the semi-instantiated VNF, the deployment specific parameters of the semi-instantiated VNF, or another information (such as a name) about the semi-instantiated VNF.

For example, any other logical function modules (such as the VNFM, the NFVO, the VIM, or the OSS/BSS) in the NFV system can initiate the "update request message", and this embodiment of the present application imposes no limitation herein.

For example, the EM or the NM may initiate, to the VNFM, an operation for deleting or modifying the semi-instantiated VNF or the instantiated VNF in some scenarios. In this case, the VNFM may perform an operation for updating the information of the semi-instantiated VNF. The scenarios may include a network element energy saving scenario, a network element relocation scenario, and the like.

The following uses a specific network element energy saving scenario to describe beneficial effects brought by using the method for managing a VNF provided in this embodiment of the present application.

To save energy, instantiated VNFs corresponding to some network elements may work in the day and not work at night. In this case, an entity device in which the instantiated VNF is located may be enabled in the day, and the entity device in which the instantiated VNF is located may be disabled at night. In other words, the instantiated VNF is generated in the day, and the instantiated VNF is deleted at night.

In the network element energy saving scenario, according to the method for managing a VNF in the prior art, the instantiated VNF needs to be deleted at night, and a corresponding resource is released. The to-be-instantiated VNF is used to generate the instantiated VNF again in the day. According to the method for managing a VNF provided in this embodiment of the present application, even if the entity device in which the instantiated VNF is located is disabled at night, because the entity device stores the information of the semi-instantiated VNF, it is only necessary to use the semi-instantiated VNF to generate the instantiated VNF in the day. Therefore, work efficiency can be improved.

Optionally, S201 may be performed in an event triggering manner. For example,

Manner 1: Allocate the resource to and configure the deployment specific parameters for the to-be-instantiated VNF to obtain the semi-instantiated VNF, when a request message used to instruct to generate a semi-instantiated VNF is received.

The "request message used to instruct to generate a semi-instantiated VNF" is a request message provided in this embodiment of the present application and is used to request to use the to-be-instantiated VNF to generate a semi-instantiated VNF. For example, in a network planning phase of actual network deployment, any logical function module in the NFV system may initiate a request message used to instruct to generate a semi-instantiated VNF to the VNFM.

Manner 1 may be applied to a scenario in which VNF instantiation is performed by stages in actual network deployment. For example, in the network planning phase, any logical function module (such as a VNFM, an NFVO, a VIM, or an OSS/BSS) in the NFV system may generate a semi-instantiated VNF. In a following network deployment phase, any logical function module in the NFV system may use semi-instantiated VNFs to generate instantiated VNFs. The two processes can be separately performed. For example, in the network planning phase, the VNFM first uses 100 to-be-instantiated VNFs to generate 100 semi-instantiated VNFs. In the following network deployment phase, the VNFM further uses the 100 semi-instantiated VNFs to generate instantiated VNFs. In this way, a prior-art problem of low work efficiency and high management difficulty caused because the network planning phase and the network deployment phase need to be cooperatively performed due to use of a technical solution in which a to-be-instantiated VNF is directly used to generate an instantiated VNF can be resolved. According to the technical solution in the prior art, the network planning phase and the network deployment phase need to be cooperatively performed. For example, if 100 to-be-instantiated VNFs are used to generate 100 instantiated VNFs, the 100 to-be-instantiated VNFs need to be used successively to generate the instantiated VNFs, that is, only after an $i^{th}$ to-be-instantiated VNF is used to generate an instantiated VNF, an $(i+1)^{th}$ to-be-instantiated VNF can be used to generate an instantiated VNF, and $1 \le i \le 100$, and i is an integer.

Manner 2: Allocate the resource to and configure the deployment specific parameters for the to-be-instantiated VNF to obtain the semi-instantiated VNF, when a request message used to instruct to generate an instantiated VNF is received.

The "request message used to instruct to generate an instantiated VNF" may be a message in the prior art, such as a VNF instantiation request. For example, when a new VNF in the NFV system needs to be instantiated, the EM or the NM initiates a VNF instantiation request to the VNFM, and the NM may be specifically an OSS or a BSS, or may be a user operation interface of an OSS or a BSS. Certainly, the "request message used to instruct to generate an instantiated VNF" may be a request message provided in this embodiment of the present application, for example, a request message sent by any logical function module in the NFV system to the VNFO.

Manner 2 may be applied to a scenario in which a to-be-instantiated VNF is used to generate an instantiated VNF, specifically may be applied to a scenario in which the to-be-instantiated VNF is used to generate an instantiated VNF for the first time. It should be noted that, in a scenario in which the to-be-instantiated VNF is used to generate an instantiated VNF not for the first time, an instantiated VNF may be directly generated by using information of a semi-instantiated VNF stored in the scenario in which an instantiated VNF is generated for the first time. For a specific implementation, refer to the following description.

Further, this embodiment of the present application further provides a technical solution in which a semi-instantiated VNF is used to generate an instantiated VNF. Specifically, Based on Manner 1

Because a trigger event in Manner 1 is "a request message used to instruct to generate a semi-instantiated VNF is received", after the semi-instantiated VNF is generated in S201, that is, a function of the request message is completed. In other words, the semi-instantiated VNF is not used to generate an instantiated VNF according to an instruction of the request message. If the semi-instantiated VNF needs to be used to generate an instantiated VNF, another trigger event is required.

In an optional embodiment, using the semi-instantiated VNF to generate an instantiated VNF may include: when a request message used to instruct to configure application specific parameters is received, configuring application specific parameters for the semi-instantiated VNF to obtain an instantiated VNF.

The "request message used to instruct to configure application specific parameters" is a request message provided in this embodiment of the present application and is used to use a semi-instantiated VNF to generate an instantiated VNF.

For example, in a network deployment phase of an actual network deployment, any logical function module (such as a VNFM, an NFVO, a VIM, or an OSS/BSS) in an NFV system may initiate a request message used to instruct to configure application specific parameters.

In another optional embodiment, using the semi-instantiated VNF to generate an instantiated VNF may include: when a request message used to instruct to generate an instantiated VNF is received, configuring application specific parameters for the semi-instantiated VNF to obtain an instantiated VNF.

For example, because the information of the semi-instantiated VNF has been stored in this optional embodiment, when the request message used to instruct to generate an instantiated VNF is received, the application specific parameters may be directly configured for the semi-instantiated VNF, so as to obtain the instantiated VNF. Compared with a solution of "using a to-be-instantiated VNF to generate an instantiated VNF when a request message used to instruct to generate an instantiated VNF is received (that is, performing a process of "allocating a resource and configuring deployment specific parameters" and a process of "configuring application specific parameters")" in the prior art, this implementation may reduce a time for generating an instantiated VNF, thereby improving work efficiency.

Based on Manner 2

Because a trigger event in Manner 2 is "a request message used to instruct to generate an instantiated VNF is received", after the semi-instantiated VNF is generated in S201, a function of the request message is not completed. In other words, the semi-instantiated VNF is further used to generate an instantiated VNF according to an instruction of the request message.

In an optional embodiment, using the semi-instantiated VNF to generate an instantiated VNF may include: according to the request message used to instruct to generate an instantiated VNF, configuring application specific parameters for the semi-instantiated VNF to obtain an instantiated VNF.

It should be noted that, in any optional embodiment based on Manner 1 and 2, using the semi-instantiated VNF to generate an instantiated VNF may be further replaced with the following step: in a preset time period after the semi-instantiated VNF is generated, configure application specific parameters for the semi-instantiated VNF to obtain the instantiated VNF. This embodiment of the present application imposes no limitation on a value of the preset time period and a manner of selecting a value of the preset time period.

It should be further noted that, in a specific implementation, after the instantiated VNF is obtained, the method may further include: storing information of the instantiated VNF; specifically, storing the instantiated VNF in an "instantiated VNF database". In a specific implementation, the VNFM may be responsible for managing the instantiated VNF database.

Further, this embodiment of the present application further provides a technical solution of how to manage a semi-instantiated VNF after an instantiated VNF is obtained. Specifically, after the instantiated VNF is obtained according to any method, the semi-instantiated VNF may be managed by using the following Manner 1 and Manner 2.

Manner 1: Delete the semi-instantiated VNF.

Manner 1 may also be described as: deleting the information of the semi-instantiated VNF.

For example, because the semi-instantiated VNF has been used to generate the instantiated VNF, the semi-instantiated VNF may be deleted to save storage space. It should be noted that Manner 1 may be further described as: deleting the information of the semi-instantiated VNF (that is, information such as the identifier of the semi-instantiated VNF, the resource information of the semi-instantiated VNF, the deployment specific parameters of the semi-instantiated VNF, and other information related to the semi-instantiated VNF).

Manner 2: Establish a mapping relationship between the semi-instantiated VNF and the instantiated VNF, and store the mapping relationship.

Manner 2 may also be described as: establishing a mapping relationship between the information of the semi-instantiated VNF and the information of the instantiated VNF, and storing the mapping relationship.

For example, a specific method for establishing the mapping relationship may include but is not limited to establishing the mapping relationship in a pointer or an index manner, for example, the information of the semi-instantiated VNF in a semi-instantiated VNF database is pointed to the information of the instantiated VNF that is generated by using the semi-instantiated VNF and that is in the instantiated VNF database.

It should be noted that in a specific implementation, Manner 1 and 2 may also be replaced with the following step: performing no operation on the semi-instantiated VNF, in other words, continuing to save the information of the semi-instantiated VNF.

It should be further noted that information stored in this embodiment of the present application, such as the information of the semi-instantiated VNF, the information of the instantiated VNF, and the mapping relationship between the semi-instantiated VNF and the instantiated VNF, may be provided for another device different from an execution body. This embodiment of the present application imposes no limitation on a specific application scenario. For example, when an entity device in which the VNFM is located is the execution body, the entity device in which the VNFM is located may provide the stored information for entity devices in which logical function modules such as the NFVO, the EM, and the NM are located.

Further, this embodiment of the present application further provides a technical solution of how to manage a semi-instantiated VNF when an instantiated VNF is deleted. For example, when a life cycle of the instantiated VNF ends, the instantiated VNF is deleted. Certainly, in another trigger event, the instantiated VNF may also be deleted.

Based on Manner 1, managing the semi-instantiated may include: before deleting the instantiated VNF or when deleting the instantiated VNF, restoring the semi-instantiated VNF.

The optional manner may specifically include: when the instantiated VNF is deleted, deleting only application specific parameters of the instantiated VNF; reserving resource information and deployment specific parameters of the instantiated VNF; and storing the resource information and the deployment specific parameters in a form of a semi-instantiated VNF (that is, re-storing information of the semi-instantiated VNF). According to this implementation, the semi-instantiated VNF may be directly used to generate the instantiated VNF, so as to improve work efficiency. Certainly, the semi-instantiated VNF may not be restored according to requirements.

Based on Manner 2, managing the semi-instantiated VNF may include: after deleting the instantiated VNF, reserving or deleting the semi-instantiated VNF. It should be noted that, after deleting the instantiated VNF, the mapping relationship between the instantiated VNF and the semi-instantiated VNF is deleted naturally.

Embodiment 2

Figure 3:
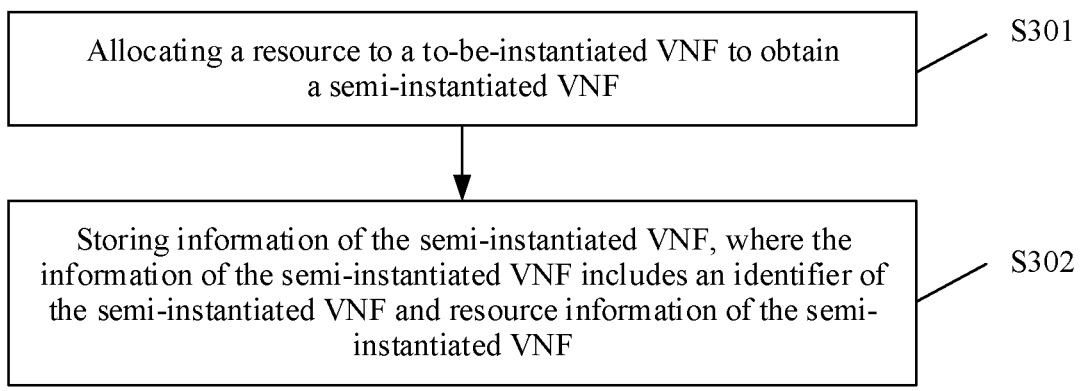
FIG. 3 is a schematic flowchart of a method for managing a VNF according to Embodiment 2 of the present application.

Referring to FIG. 3, FIG. 3 is a schematic flowchart of a method for managing a VNF according to this embodiment. For explanations of related content in this embodiment, refer to Embodiment 1, and details are not described herein. The method shown in FIG. 3 includes the following steps S301 and S302.

S301. Allocate a resource to a to-be-instantiated VNF to obtain a semi-instantiated VNF.

In this embodiment, the "semi-instantiated VNF" is a VNF that is obtained after the resource is allocated to the to-be-instantiated VNF and before deployment specific parameters are configured for the to-be-instantiated VNF. "The resource allocated to the to-be-instantiated VNF" may include one or a combination of multiple of the following: a storage resource, a computing resource, and a network resource.

Optionally, S301 may include:

Manner (1): Allocate the resource to the to-be-instantiated VNF to obtain the semi-instantiated VNF, when a request message used to instruct to generate a semi-instantiated VNF is received.

Manner (2): Allocate the resource to the to-be-instantiated VNF to obtain the semi-instantiated VNF, when a request message used to instruct to generate an instantiated VNF is received.

S302. Store information of the semi-instantiated VNF, where the information of the semi-instantiated VNF includes an identifier of the semi-instantiated VNF and resource information of the semi-instantiated VNF.

The "identifier of the semi-instantiated VNF" includes one or a combination of multiple of the following: a string, a hexadecimal string, and a binary string.

Based on Manner (1), after S302, the method may further include: when a request message used to instruct to configure deployment specific parameters and application specific parameters is received, configuring deployment specific parameters and application specific parameters for the semi-instantiated VNF to obtain an instantiated VNF; or when the request message used to instruct to generate an instantiated VNF is received, configuring deployment specific parameters and application specific parameters to the semi-instantiated VNF to obtain an instantiated VNF.

It should be noted that the request message used to instruct to configure deployment specific parameters and application specific parameters may be one message or may be two separate messages (that is, a request message used to instruct to configure deployment specific parameters and a request message used to instruct to configure application specific parameters).

Optionally, the "deployment specific parameters" may include one or a combination of multiple of the following: vendor information, a virtual deployment unit, a virtual link, a connection point, a deployment flavour, and an auto scaling policy.

It should be further noted that, in a specific implementation, the method may further include: storing information of a VNF for which the deployment specific parameters are configured but no application specific parameters are configured; and after an instantiated VNF is generated or an instantiated VNF is deleted subsequently and when information of updating information of the VNF is received, independently managing the information.

Based on Manner (2), after S302, the method may further include: configuring, according to the request message used to instruct to generate an instantiated VNF, deployment specific parameters and application specific parameters for the semi-instantiated VNF to obtain an instantiated VNF.

Further, based on this embodiment, this embodiment of the present application further provides a technical solution of how to manage a semi-instantiated VNF after an instantiated VNF is obtained. Specifically, the solution may include: deleting the semi-instantiated VNF; or establishing a mapping relationship between the semi-instantiated VNF and the instantiated VNF, and storing the mapping relationship.

Still further, based on this embodiment, this embodiment of the present application further provides a technical solution of how to manage a semi-instantiated VNF when an instantiated VNF is deleted. Specifically, the solution may include: when the semi-instantiated VNF is deleted, and before deleting the instantiated VNF or when deleting the instantiated VNF, restoring the semi-instantiated VNF; or when the mapping relationship between the semi-instantiated VNF and the instantiated VNF is established, and the mapping relationship is stored, and after deleting the instantiated VNF, reserving or deleting the semi-instantiated VNF.

Optionally, after S302, the method may further include: when receiving an update request message, updating the information of the semi-instantiated VNF, where the update request message is used to instruct to delete or modify the semi-instantiated VNF.

According to the method for managing a VNF provided in this embodiment, a semi-instantiated VNF is obtained by allocating a resource to a to-be-instantiated VNF, and information of the semi-instantiated VNF is stored, where the information includes an identifier of the semi-instantiated VNF and resource information of the semi-instantiated VNF. In this way, because the information of the semi-instantiated VNF is stored, the information can be applied to another scenario. For example, in a scenario in which instantiation is re-performed on a same to-be-instantiated VNF, a step of allocating a resource does not need to be performed again, and an instantiated VNF may be directly generated by using the stored information of the semi-instantiated VNF, so as to improve work efficiency and resource usage.

In addition, in a scenario in which an instantiated VNF is generated, if an error occurs in subsequent application specific parameters configuration, because a step of allocating a resource, a step of configuring deployment specific parameters, and a step of configuring application specific parameters are "tightly coupled" in the prior art, in this scenario, a resource allocated to the VNF needs to be released, and the step of allocating a resource, the step of configuring deployment specific parameters, and the step of configuring application specific parameters need to be performed again. In this embodiment, the resource does not need to be released, and the deployment specific parameters and the application specific parameters may be configured for the stored semi-instantiated VNF to generate an instantiated VNF. It can be learned that work efficiency and resource usage can be improved according to the method provided in this embodiment.

The following describes an apparatus provided in this embodiment of the present application.

It should be noted that any apparatus provided in the following can be applied to the NFV system architecture shown in FIG. 1. The apparatus may be specifically an entity device in which any logical function module (such as a VNFM, an NFVO, a VIM, or an OSS/BSS) in the system architecture is located, or may be an independent device. The independent device may be integrated or installed in the entity device in which the any logical function module is located, or may be independent of the entity device in which the any logical function module is located and may directly or indirectly communicate with the entity device in which the any logical function module is located. In addition, the apparatus may be further presented in a form of a chip, and the chip carries an application program that can implement a flowchart of the method for managing a VNF.

For example, when any apparatus provided in the following is an entity device in which any logical function module is located in the NFV system architecture shown in FIG. 1, the apparatus may be specifically any network element in an access network or a core network, such as an SGW, a PGW, a base station, or an MME.

It should be further noted that, for explanations of related content in an apparatus embodiment provided in the following, refer to the method embodiment that is provided in the above and that is corresponding to the apparatus embodiment, and details are not described herein.

Embodiment 3

Figure 4:
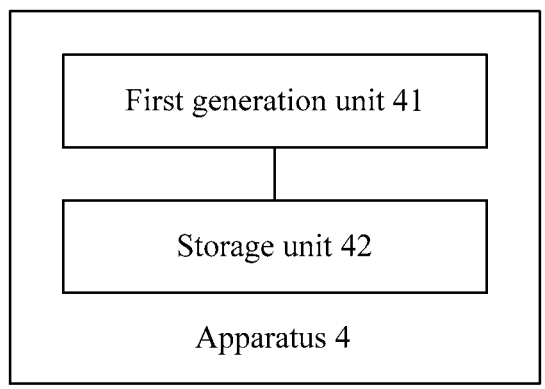
FIG. 4 is a schematic structural diagram of an apparatus according to Embodiment 3 of the present application.

Referring to FIG. 4, FIG. 4 is a schematic structural diagram of an apparatus according to this embodiment, configured to execute the method for managing a VNF provided in Embodiment 1. For explanations of related content in this embodiment, refer to Embodiment 1. An apparatus 4 shown in FIG. 4 may include:

a first generation unit 41, configured to allocate a resource to and configure deployment specific parameters for a to-be-instantiated VNF to obtain a semi-instantiated VNF; and a storage unit 42, configured to store information of the semi-instantiated VNF, where the information of the semi-instantiated VNF includes an identifier of the semi-instantiated VNF, resource information of the semi-instantiated VNF, and deployment specific parameters of the semi-instantiated VNF.

In a first implementation provided in this embodiment, the first generation unit 41 is specifically configured to allocate the resource to and configure the deployment specific parameters for the to-be-instantiated VNF to obtain the semi-instantiated VNF, when receiving a request message used to instruct to generate a semi-instantiated VNF.

In a second implementation provided in this embodiment, the first generation unit 41 is specifically configured to allocate the resource to and configure the deployment specific parameters for the to-be-instantiated VNF to obtain the semi-instantiated VNF, when receiving a request message used to instruct to generate an instantiated VNF.

Figure 5:
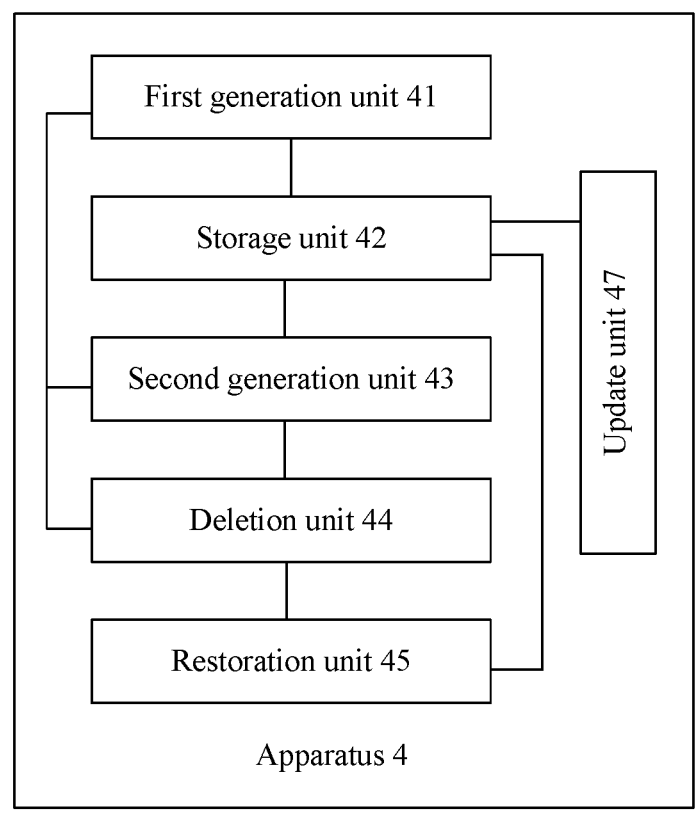
FIG. 5 is a schematic structural diagram of another apparatus according to Embodiment 3 of the present application.

Referring to FIG. 5, FIG. 5 is a schematic structural diagram of another apparatus according to this embodiment. As shown in FIG. 5, based on the apparatus 4 shown in FIG. 4, the apparatus 4 may further include a second generation unit 43.

Based on the first implementation, the second generation unit 43 is configured to: when receiving a request message used to instruct to configure application specific parameters, configure application specific parameters for the semi-instantiated VNF to obtain an instantiated VNF; or when receiving the request message used to instruct to generate an instantiated VNF, configure application specific parameters for the semi-instantiated VNF to obtain an instantiated VNF.

Based on the second implementation, the second generation unit 43 is configured to: according to the request message used to instruct to generate an instantiated VNF, configure application specific parameters for the semi-instantiated VNF to obtain an instantiated VNF.

Optionally, based on any implementation, as shown in FIG. 5, the apparatus 4 further includes a deletion unit 44, configured to: after the second generation unit 43 obtains the instantiated VNF, delete the semi-instantiated VNF.

For example, the deletion unit 44 is further configured to: after deleting the instantiated VNF, delete the semi-instantiated VNF. As shown in FIG. 5, the apparatus 4 further includes a restoration unit 45, configured to: before the deletion unit 44 deletes the instantiated VNF or when the deletion unit 44 deletes the instantiated VNF, restore the semi-instantiated VNF.

Figure 6:
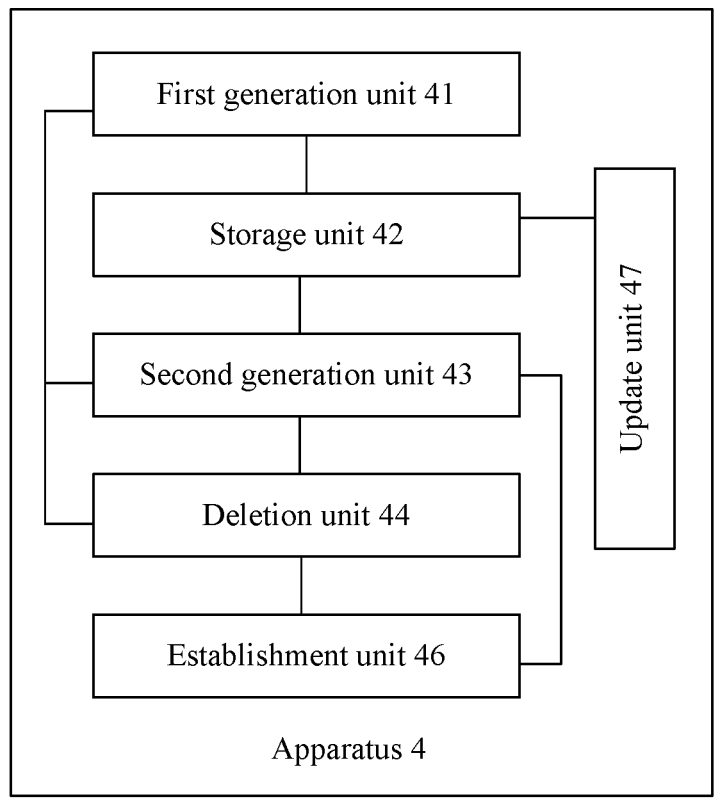
FIG. 6 is a schematic structural diagram of another apparatus according to Embodiment 3 of the present application.

Optionally, based on any implementation, as shown in FIG. 6, the apparatus 4 further includes an establishment unit 46, configured to: after the second generation unit 43 obtains the instantiated VNF, establish a mapping relationship between the semi-instantiated VNF and the instantiated VNF. The storage unit 42 is further configured to store the mapping relationship.

For example, as shown in FIG. 6, the apparatus 4 further includes a deletion unit 44, configured to: after the storage unit 42 stores the mapping relationship, delete the instantiated VNF. The storage unit 42 is further configured to: after the deletion unit deletes the instantiated VNF, reserve the semi-instantiated VNF. Alternatively, as shown in FIG. 6, the apparatus 4 further includes a deletion unit 44, configured to: after the storage unit 42 stores the mapping relationship, and after deleting the instantiated VNF, delete the semi-instantiated VNF.

Optionally, as shown in FIG. 5 or FIG. 6, the apparatus 4 further includes:

an update unit 47, configured to: when receiving an update request message, update the information of the semi-instantiated VNF, where the update request message is used to instruct to delete or modify the semi-instantiated VNF.

The apparatus provided in this embodiment obtains a semi-instantiated VNF by allocating a resource to and configuring deployment specific parameters for a to-be-instantiated VNF, and stores information of the semi-instantiated VNF, where the information includes an identifier of the semi-instantiated VNF, resource information of the semi-instantiated VNF, and deployment specific parameters of the semi-instantiated VNF. In this way, because the information of the semi-instantiated VNF is stored, the information can be applied to another scenario. For example, in a scenario in which instantiation is re-performed on a same to-be-instantiated VNF, a step of allocating a resource and a step of configuring deployment specific parameters do not need to be performed again, and an instantiated VNF may be directly generated by using the stored information of the semi-instantiated VNF, so as to improve work efficiency.

Embodiment 4

In a hardware implementation, the storage unit 42 in Embodiment 3 may be a memory, and the first generation unit 41, the second generation unit 43, the deletion unit 44, the restoration unit 45, the establishment unit 46, and the update unit 47 may be built in or independent of the memory of the apparatus in a hardware form, so that a processor invokes and executes an operation corresponding to each module. The processor may be a central processing unit (CPU), a microprocessor, a single-chip microcomputer, or the like.

Figure 7:
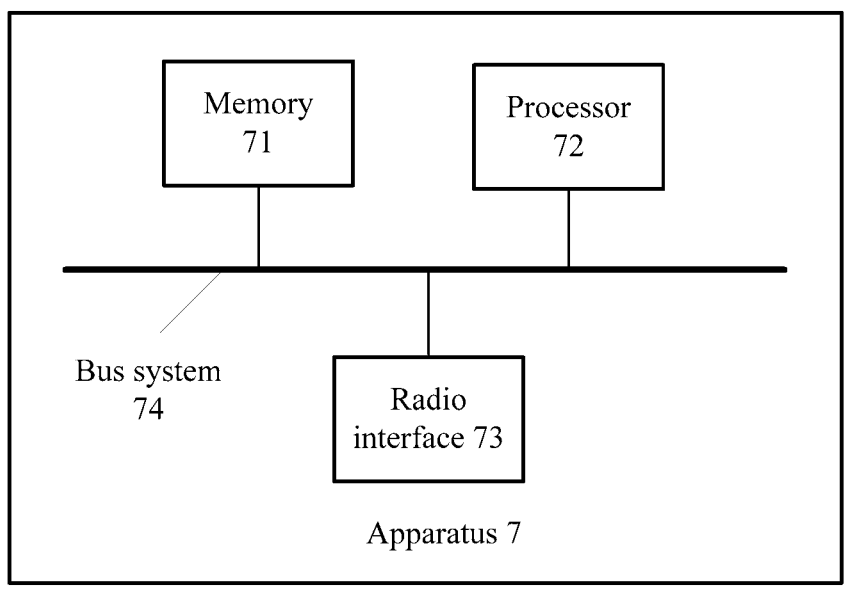
FIG. 7 is a schematic structural diagram of an apparatus according to Embodiment 4 of the present application.

Referring to FIG. 7, FIG. 7 is a schematic structural diagram of an apparatus according to this embodiment, configured to execute the method for managing a VNF provided in Embodiment 1. For explanations of related content in this embodiment, refer to Embodiment 1. An apparatus 7 shown in FIG. 7 may include a memory 71, a processor 72, and a radio interface 73.

The memory 71 and the processor 72 are coupled together by using a bus system 74.

For example, the bus system 74 may be an industry standard architecture (ISA) bus, a peripheral component interconnect (PCI) bus, an extended industry standard architecture (EISA) bus, or the like. The bus system 74 may be classified into an address bus, a data bus, a control bus, and the like. For ease of illustration, only one bold line is used in FIG. 7 to represent the bus, which, however, does not mean that there is only one bus or only one type of bus.

The radio interface 73 is configured to implement communication between the apparatus 7 and another device.

The memory 71 is configured to store a program. Specifically, the program may include program code, and the program code includes a computer operation instruction. For example, the memory 71 may include a high-speed random access memory (RAM), or may further include a non-volatile memory, for example, at least one disk storage.

The processor 72 executes the program stored in the memory 71, so as to implement the method for managing a VNF provided in Embodiment 1.

In one embodiment, the processor 72 is configured to allocate a resource to and configure deployment specific parameters for a to-be-instantiated VNF to obtain a semi-instantiated VNF. The memory 71 is configured to store information of the semi-instantiated VNF, where the information of the semi-instantiated VNF includes an identifier of the semi-instantiated VNF, resource information of the semi-instantiated VNF, and deployment specific parameters of the semi-instantiated VNF.

It should be noted that, when the apparatus 7 provided in this embodiment is applied to the NFV system architecture shown in FIG. 1, the memory 71 may be a hardware storage resource provided by a VIM; in other words, the memory 71 is a hardware resource on a bottom layer in the NFV system.

Figure 8:
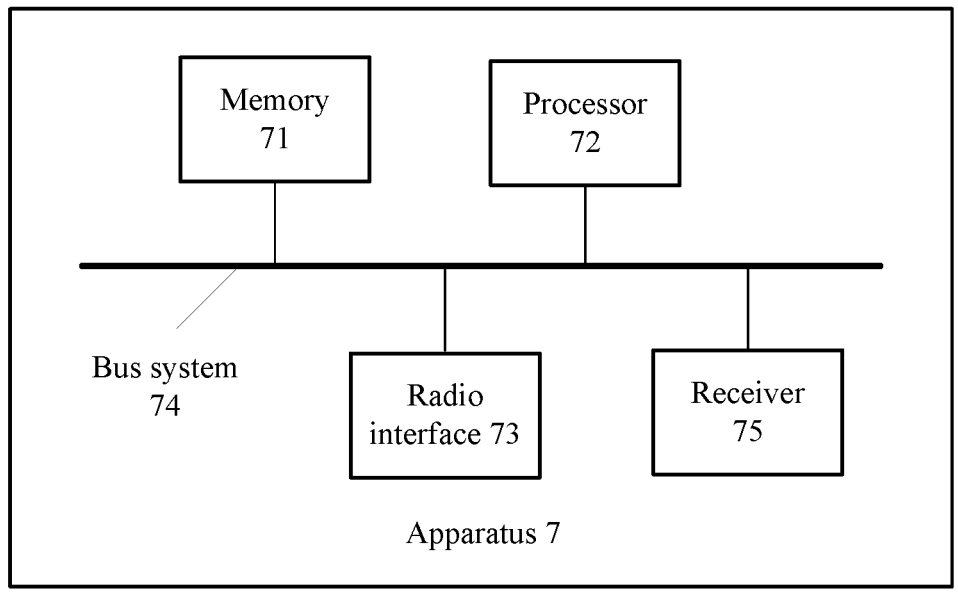
FIG. 8 is a schematic structural diagram of another apparatus according to Embodiment 4 of the present application.

Optionally, referring to FIG. 8, FIG. 8 is a schematic structural diagram of another apparatus according to this embodiment. As shown in FIG. 8, based on FIG. 7, the apparatus 7 may further include a receiver 75.

In a first implementation provided in this embodiment, the receiver 75 is configured to receive a request message used to instruct to generate a semi-instantiated VNF. The processor 72 is specifically configured to: when the receiver 75 receives the request message used to instruct to generate a semi-instantiated VNF, allocate a resource to and configure deployment specific parameters for a to-be-instantiated VNF to obtain a semi-instantiated VNF.

In a second implementation provided in this embodiment, the receiver 75 is configured to receive a request message used to instruct to generate an instantiated VNF. The processor 72 is specifically configured to: when the receiver 75 receives the request message used to instruct to generate an instantiated VNF, allocate a resource to and configure deployment specific parameters for a to-be-instantiated VNF to obtain a semi-instantiated VNF.

Optionally, in the first implementation provided in this embodiment, the receiver 75 is further configured to receive a request message used to instruct to configure application specific parameters. The processor 72 is further configured to: when the receiver 75 receives the request message used to instruct to configure application specific parameters, configure application specific parameters for the semi-instantiated VNF to obtain an instantiated VNF.

Alternatively, the receiver 75 is further configured to receive the request message used to instruct to generate an instantiated VNF. The processor 72 is further configured to: when the receiver 75 receives the request message used to instruct to generate an instantiated VNF, configure application specific parameters for the semi-instantiated VNF to obtain an instantiated VNF.

Optionally, in the second implementation provided in this embodiment, the processor 72 is further configured to: according to the request message used to instruct to generate an instantiated VNF, configure application specific parameters for the semi-instantiated VNF to obtain an instantiated VNF.

Optionally, based on any implementation, the processor 72 is further configured to: after the instantiated VNF is obtained, delete the semi-instantiated VNF.

For example, the processor 72 is further configured to: after deleting the instantiated VNF, delete the semi-instantiated VNF. Further, the processor 72 is further configured to: before deleting the instantiated VNF or when deleting the instantiated VNF, restore the semi-instantiated VNF.

Optionally, based on any implementation, the processor 72 is further configured to: after the instantiated VNF is obtained, establish a mapping relationship between the semi-instantiated VNF and the instantiated VNF; and the memory 71 is further configured to store the mapping relationship.

For example, the processor 72 is further configured to: after the memory 71 stores the mapping relationship, delete the instantiated VNF. In this case, the memory 71 is further configured to: before the processor 72 deletes the instantiated VNF or when the processor 72 deletes the instantiated VNF, reserve the semi-instantiated VNF. Alternatively, the processor 72 is further configured to: after the memory 71 stores the mapping relationship, and after deleting the instantiated VNF, delete the semi-instantiated VNF.

Optionally, the receiver 75 is further configured to receive an update request message, where the update request message is used to instruct to delete or modify the semi-instantiated VNF. In this case, the processor 72 is further configured to: when the receiver 75 receives the update request message, update the information of the semi-instantiated VNF.

The apparatus provided in this embodiment obtains a semi-instantiated VNF by allocating a resource to and configuring deployment specific parameters for a to-be-instantiated VNF, and stores information of the semi-instantiated VNF, where the information includes an identifier of the semi-instantiated VNF, resource information of the semi-instantiated VNF, and deployment specific parameters of the semi-instantiated VNF. In this way, because the information of the semi-instantiated VNF is stored, the information can be applied to another scenario. For example, in a scenario in which instantiation is re-performed on a same to-be-instantiated VNF, a step of allocating a resource and a step of configuring deployment specific parameters do not need to be performed again, and an instantiated VNF may be directly generated by using the stored information of the semi-instantiated VNF, so as to improve work efficiency and resource usage.

Embodiment 5

Figure 9:
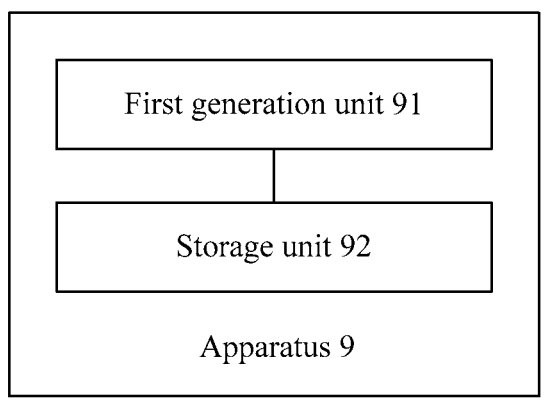
FIG. 9 is a schematic structural diagram of an apparatus according to Embodiment 5 of the present application.

Referring to FIG. 9, FIG. 9 is a schematic structural diagram of an apparatus according to this embodiment, configured to execute the method for managing a VNF provided in Embodiment 2. For explanations of related content in this embodiment, refer to Embodiment 2. An apparatus 9 shown in FIG. 9 may include:

a first generation unit 91, configured to allocate a resource to a to-be-instantiated VNF to obtain a semi-instantiated VNF; and a storage unit 92, configured to store information of the semi-instantiated VNF, where the information of the semi-instantiated VNF includes an identifier of the semi-instantiated VNF and resource information of the semi-instantiated VNF.

Optionally, the first generation unit 91 is specifically configured to:

allocate the resource to the to-be-instantiated VNF to obtain the semi-instantiated VNF, when receiving a request message used to instruct to generate a semi-instantiated VNF; or allocate the resource to the to-be-instantiated VNF to obtain the semi-instantiated VNF, when receiving a request message used to instruct to generate an instantiated VNF.

Figure 10:
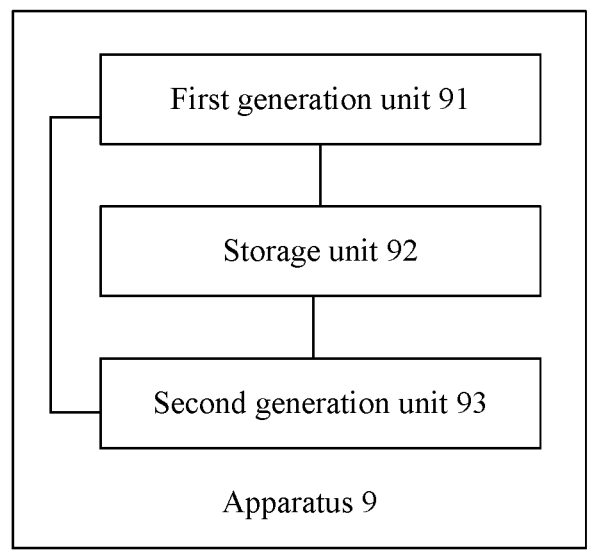
FIG. 10 is a schematic structural diagram of another apparatus according to Embodiment 5 of the present application.

Referring to FIG. 10, FIG. 10 is a schematic structural diagram of another apparatus according to this embodiment. As shown in FIG. 10, based on the apparatus 9 shown in FIG. 9, the apparatus 9 may further include a second generation unit 93.

Optionally, the second generation unit 93 is configured to:

after the first generation unit allocates the resource to the to-be-instantiated VNF to obtain the semi-instantiated VNF, when receiving the request message used to instruct to generate a semi-instantiated VNF, configure deployment specific parameters and application specific parameters for the semi-instantiated VNF to obtain an instantiated VNF, when receiving a request message used to instruct to configure deployment specific parameters and application specific parameters; or after the first generation unit allocates the resource to the to-be-instantiated VNF to obtain the semi-instantiated VNF, when receiving the request message used to instruct to generate a semi-instantiated VNF, configure deployment specific parameters and application specific parameters for the semi-instantiated VNF to obtain an instantiated VNF, when receiving the request message used to instruct to generate an instantiated VNF.

Optionally, the second generation unit 93 is configured to:

after the first generation unit allocates the resource to the to-be-instantiated VNF to obtain the semi-instantiated VNF, when receiving the request message used to instruct to generate an instantiated VNF, configure, according to the request message used to instruct to generate an instantiated VNF, deployment specific parameters and application specific parameters for the semi-instantiated VNF to obtain an instantiated VNF.

It should be noted that, similar to the apparatus 4 provided in Embodiment 3, the apparatus 9 provided in this embodiment may further include a deletion unit, a restoration unit, an establishment unit, an update unit, and the like. For specific functions of the units, refer to the deletion unit 44, the restoration unit 45, the establishment unit 46, and the update unit 47 provided in the apparatus 4. Details are not described herein.

The apparatus provided in this embodiment obtains a semi-instantiated VNF by allocating a resource to a to-be-instantiated VNF, and stores information of the semi-instantiated VNF, where the information includes an identifier of the semi-instantiated VNF and resource information of the semi-instantiated VNF. In this way, because the information of the semi-instantiated VNF is stored, the information can be applied to another scenario. For example, in a scenario in which instantiation is re-performed on a same to-be-instantiated VNF, a step of allocating a resource does not need to be performed again, and an instantiated VNF may be directly generated by using the stored information of the semi-instantiated VNF, so as to improve work efficiency and resource usage.

Embodiment 6

In a hardware implementation, the storage unit 92 in Embodiment 5 may be a memory, and the first generation unit 91 and the second generation unit 93 may be built in or independent of the memory of the apparatus in a hardware form, so that a processor invokes and executes an operation corresponding to each module, and the processor may be a CPU, a microprocessor, a single-chip microcomputer, or the like.

Figure 11:
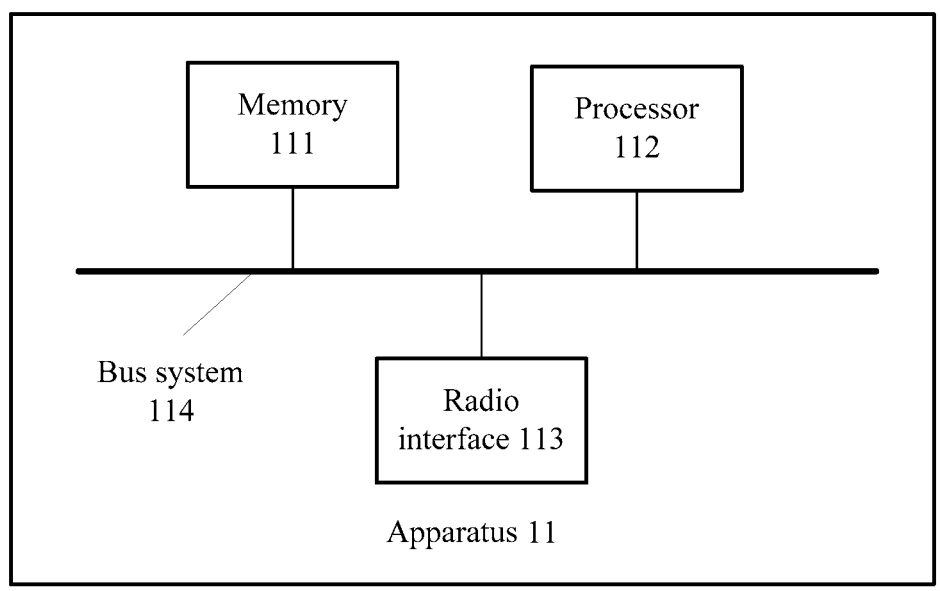
FIG. 11 is a schematic structural diagram of an apparatus according to Embodiment 6 of the present application.

Referring to FIG. 11, FIG. 11 is a schematic structural diagram of an apparatus according to this embodiment, configured to execute the method for managing a VNF provided in Embodiment 2. For explanations of related content in this embodiment, refer to Embodiment 2. An apparatus 11 shown in FIG. 11 may include a memory 111, a processor 112, and a radio interface 113.

The memory 111 and the processor 112 are coupled together by using a bus system 114. For example, for explanations of the bus system 114 and the memory 111, refer to the description of the bus system 74 and the memory 71 in Embodiment 4.

The radio interface 113 is configured to implement communication between the apparatus 11 and another device.

The memory 111 is configured to store a program. Specifically, the program may include program code, and the program code includes a computer operation instruction.

The processor 112 executes the program stored in the memory 111, so as to implement the method for managing a VNF provided in Embodiment 2.

In one embodiment, the processor 112 is configured to allocate a resource to a to-be-instantiated VNF to obtain a semi-instantiated VNF. The memory 111 is configured to store information of the semi-instantiated VNF, where the information of the semi-instantiated VNF includes an identifier of the semi-instantiated VNF and resource information of the semi-instantiated VNF.

It should be noted that, when the apparatus 11 provided in this embodiment is applied to the NFV system architecture shown in FIG. 1, the memory 111 may be a hardware storage resource provided by a VIM; in other words, the memory 111 is a hardware resource on a bottom layer in the NFV system.

Figure 12:
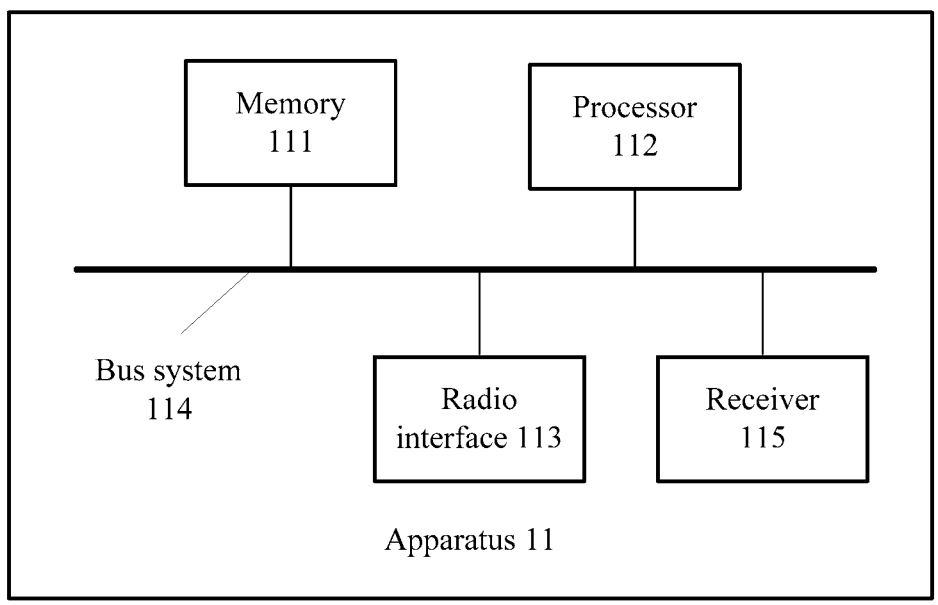
FIG. 12 is a schematic structural diagram of another apparatus according to Embodiment 6 of the present application.

Referring to FIG. 12, FIG. 12 is a schematic structural diagram of another apparatus according to this embodiment. As shown in FIG. 12, based on the apparatus 11 shown in FIG. 11, the apparatus 11 may further include a receiver 115.

In a first implementation provided in this embodiment, the receiver 115 is configured to receive a request message used to instruct to generate a semi-instantiated VNF. In this case, the processor 112 is specifically configured to: when the receiver 115 receives the request message used to instruct to generate a semi-instantiated VNF, allocate a resource to a to-be-instantiated VNF to obtain a semi-instantiated VNF.

In a second implementation provided in this embodiment, the receiver 115 is configured to receive a request message used to instruct to generate an instantiated VNF. In this case, the processor 112 is specifically configured to: when the receiver 115 receives the request message used to instruct to generate an instantiated VNF, allocate a resource to a to-be-instantiated VNF to obtain a semi-instantiated VNF.

Optionally, in the first implementation provided in this embodiment, the receiver 115 is further configured to receive a request message used to instruct to configure deployment specific parameters and application specific parameters. The processor 112 is further configured to: when the receiver 115 receives the request message used to instruct to configure deployment specific parameters and application specific parameters, configure deployment specific parameters and application specific parameters for the semi-instantiated VNF to obtain an instantiated VNF.

Alternatively, the receiver 115 is further configured to receive the request message used to instruct to generate an instantiated VNF. The processor 112 is further configured to: when the receiver 115 receives the request message used to instruct to generate an instantiated VNF, configure deployment specific parameters and application specific parameters for the semi-instantiated VNF to obtain an instantiated VNF.

Optionally, in the second implementation provided in this embodiment, the processor 112 is further configured to: according to the request message used to instruct to generate an instantiated VNF, configure deployment specific parameters and application specific parameters for the semi-instantiated VNF to obtain an instantiated VNF.

It should be noted that, similar to the apparatus 7 provided in Embodiment 4, the processor 112 may be further configured to perform steps such as deleting, restoring, and updating. For details, refer to related content in the apparatus 11, and details are not described herein.

The apparatus provided in this embodiment obtains a semi-instantiated VNF by allocating a resource to a to-be-instantiated VNF, and stores information of the semi-instantiated VNF, where the information includes an identifier of the semi-instantiated VNF and resource information of the semi-instantiated VNF. In this way, because the information of the semi-instantiated VNF is stored, the information can be applied to another scenario. For example, in a scenario in which instantiation is re-performed on a same to-be-instantiated VNF, a step of allocating a resource does not need to be performed again, and an instantiated VNF may be directly generated by using the stored information of the semi-instantiated VNF, so as to improve work efficiency and resource usage.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a RAM, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for managing a virtualized network function (VNF), comprising:
    in response to receiving a request message used to instruct to generate an instantiated VNF:
        allocating a resource to a to-be-instantiated VNF;
        configuring deployment specific parameters for the to-be-instantiated VNF to obtain a semi-instantiated VNF,
    wherein the semi-instantiated VNF is a VNF that is obtained: after the resource is allocated to and deployment specific parameters are configured for the to-be-instantiated VNF, and before application specific parameters are configured for the to-be-instantiated VNF, wherein the deployment specific parameters of the semi-instantiated VNF comprise at least one of the following information: a virtual link, a connection point, and an auto scaling policy;
    storing information of the semi-instantiated VNF, wherein the information of the semi-instantiated VNF comprises an identifier of the semi-instantiated VNF, resource information indicating the allocated resource of the semi-instantiated VNF, and the deployment specific parameters of the semi-instantiated VNF;
    in response to receiving a request message to re-perform instantiation on a same to-be-instantiated VNF, directly generating the instantiated VNF using the stored resource information and the stored deployment specific parameters of the semi-instantiated VNF without performing the allocating and configuring steps of the method; and
    updating the information of the semi-instantiated VNF to save energy for a network element, and
    wherein an entity device in which the instantiated VNF is located is enabled during a first portion of the day and disabled during a second portion of the day, and wherein the semi-instantiated VNF generates the instantiated VNF in response to the entity device being enabled.

2. The method according to claim 1, wherein after allocating the resource to the to-be-instantiated VNF and configuring the deployment specific parameters for the to-be-instantiated VNF to obtain the semi-instantiated VNF, in response to receiving the request message used to instruct to generate the instantiated VNF, the method further comprises:
    configuring, according to the request message used to instruct to generate the instantiated VNF, application specific parameters for the semi-instantiated VNF to obtain the instantiated VNF.

3. The method according to claim 2, wherein after the instantiated VNF is obtained, the method further comprises:
    deleting the semi-instantiated VNF; or
    establishing a mapping relationship between the semi-instantiated VNF and the instantiated VNF, and storing the mapping relationship.

4. The method according to claim 3, wherein after deleting the semi-instantiated VNF, the method further comprises:
    before deleting the instantiated VNF or when deleting the instantiated VNF, restoring the semi-instantiated VNF.

5. The method according to claim 3, wherein after establishing the mapping relationship between the semi-instantiated VNF and the instantiated VNF, and storing the mapping relationship, the method further comprises:
    after deleting the instantiated VNF, reserving or deleting the semi-instantiated VNF.

6. The method according to claim 1, wherein after storing information of the semi-instantiated VNF, the method further comprises:
    in response to receiving an update request message, updating the information of the semi-instantiated VNF, wherein the update request message is used to instruct to delete or modify the semi-instantiated VNF.

7. The method according to claim 1, wherein the resource information of the semi-instantiated VNF comprises at least one of the following information: a storage resource, a computing resource, and a network resource.

8. The method according to claim 1, wherein the deployment specific parameters of the semi-instantiated VNF comprise vendor information.

9. An apparatus, comprising:
    a memory storing program instructions; and
    a processor coupled to the memory, wherein the program instructions, when executed by the processor, cause the apparatus to:
    in response to receiving a request message used to instruct to generate an instantiated VNF:
        allocate a resource to a to-be-instantiated virtualized network function (VNF); and
        configure deployment specific parameters for the to-be-instantiated VNF to obtain a semi-instantiated VNF,
        wherein the semi-instantiated VNF is a VNF that is obtained after the resource is allocated to and deployment specific parameters are configured for the to-be-instantiated VNF and before application specific parameters are configured for the to-be-instantiated VNF, wherein the deployment specific parameters of the semi-instantiated VNF comprise at least one of the following information: a virtual link, a connection point, and an auto scaling policy;
    store information of the semi-instantiated VNF, wherein the information of the semi-instantiated VNF comprises an identifier of the semi-instantiated VNF, resource information indicating the allocated resource of the semi-instantiated VNF, and the deployment specific parameters of the semi-instantiated VNF;

in response to receiving a request message to re-perform instantiation on a same to-be-instantiated VNF, directly generating the instantiated VNF using the stored resource information and the stored deployment specific parameters of the semi-instantiated VNF without performing, by the apparatus, the allocating and configuring steps; and update the information of the semi-instantiated VNF to save energy for a network element, and wherein an entity device in which the instantiated VNF is located is enabled during a first portion of the day and disabled during a second portion of the day, and wherein the semi-instantiated VNF generates the instantiated VNF in response to the entity device being enabled.

10. The apparatus according to claim 9, wherein the program instructions, when executed by the processor, further cause the apparatus to:

configure, according to the request message used to instruct to generate the instantiated VNF, application specific parameters for the semi-instantiated VNF to obtain the instantiated VNF.

11. The apparatus according to claim 10, wherein the program instructions, when executed by the processor, further cause the apparatus to delete the semi-instantiated VNF after the instantiated VNF is obtained.

12. The apparatus according to claim 11, wherein the program instructions, when executed by the processor, further cause the apparatus to:

restore the semi-instantiated VNF before deleting the instantiated VNF or when deleting the instantiated VNF.

13. The apparatus according to claim 10, wherein the program instructions, when executed by the processor, further cause the apparatus to:

establish a mapping relationship between the semi-instantiated VNF and the instantiated VNF after the instantiated VNF is obtained; and store the mapping relationship.

14. The apparatus according to claim 13, wherein the program instructions, when executed by the processor, further cause the apparatus to:

after deleting the instantiated VNF, reserve or delete the semi-instantiated VNF.

15. The apparatus according to claim 9, wherein the program instructions, when executed by the processor, further cause the apparatus to:

receive an update request message, where the update request message is used to instruct to delete or modify the semi-instantiated VNF; and update the information of the semi-instantiated VNF in response to the update request message.

16. The apparatus according to claim 9, wherein the resource information of the semi-instantiated VNF comprises at least one of the following information: a storage resource, a computing resource, and a network resource.

17. The apparatus according to claim 9, wherein the deployment specific parameters of the semi-instantiated VNF comprise vendor information.

18. A non-transitory computer-readable storage medium comprising instructions which, when executed by a computer, cause the computer to:

in response to receiving a request message used to instruct to generate an instantiated VNF:

allocate a resource to a to-be-instantiated virtualized network function (VNF); and configure deployment specific parameters for the to-be-instantiated VNF to obtain a semi-instantiated VNF, wherein the semi-instantiated VNF is a VNF that is obtained after the resource is allocated to and deployment specific parameters are configured for the to-be-instantiated VNF and before application specific parameters are configured for the to-be-instantiated VNF, wherein the deployment specific parameters of the semi-instantiated VNF comprise at least one of the following information: a virtual link, a connection point, and an auto scaling policy;

store information of the semi-instantiated VNF, wherein the information of the semi-instantiated VNF comprises an identifier of the semi-instantiated VNF, resource information indicating the allocated resource of the semi-instantiated VNF, and the deployment specific parameters of the semi-instantiated VNF;

in response to receiving a request message to re-perform instantiation on a same to-be-instantiated VNF, directly generating the instantiated VNF using the stored resource information and the stored deployment specific parameters of the semi-instantiated VNF without performing, by the computer, the allocating and configuring steps; and update the information of the semi-instantiated VNF to save energy for a network element, and wherein an entity device in which the instantiated VNF is located is enabled during a first portion of the day and disabled during a second portion of the day, and wherein the semi-instantiated VNF generates the instantiated VNF in response to the entity device being enabled.

* * * * *